United States Patent [19]

Steinbatz

[11] 4,047,818
[45] Sept. 13, 1977

[54] FILTER REGULATOR FOR MICROSPECTROPHOTOMETER

[75] Inventor: Alfred Steinbatz, Vienna, Austria

[73] Assignee: C. Reichert Optische Werke, AG, Vienna, Austria

[21] Appl. No.: 626,440

[22] Filed: Oct. 28, 1975

[30] Foreign Application Priority Data

Oct. 14, 1974  Austria .................................. 8221/74

[51] Int. Cl.[2] ............................................. G01J 3/48
[52] U.S. Cl. .................................... 356/189; 318/663; 356/100
[58] Field of Search ................. 356/188, 189, 96, 100, 356/175, 176, 177; 318/663; 250/226

[56] References Cited

U.S. PATENT DOCUMENTS

| | | | |
|---|---|---|---|
| 3,418,547 | 12/1968 | Dudler | 318/663 |
| 3,667,024 | 5/1972 | Deming | 318/663 |
| 3,704,953 | 12/1972 | Carter et al. | 356/100 |
| 3,789,283 | 1/1974 | Kabat | 318/663 |
| 3,885,879 | 5/1975 | Louder et al. | 356/189 |

*Primary Examiner*—Vincent P. McGraw
*Attorney, Agent, or Firm*—Alan H. Spencer; William C. Nealon; H. R. Berkenstock, Jr.

[57] ABSTRACT

An adjustable filter regulator for a microspectrophotometer including adjustment means connected to a scale for controlling the setting of the interference filter wherein the filter is moveably connected to a servomotor; follower circuit, differential amplifier, and signal transmitter.

2 Claims, 1 Drawing Figure

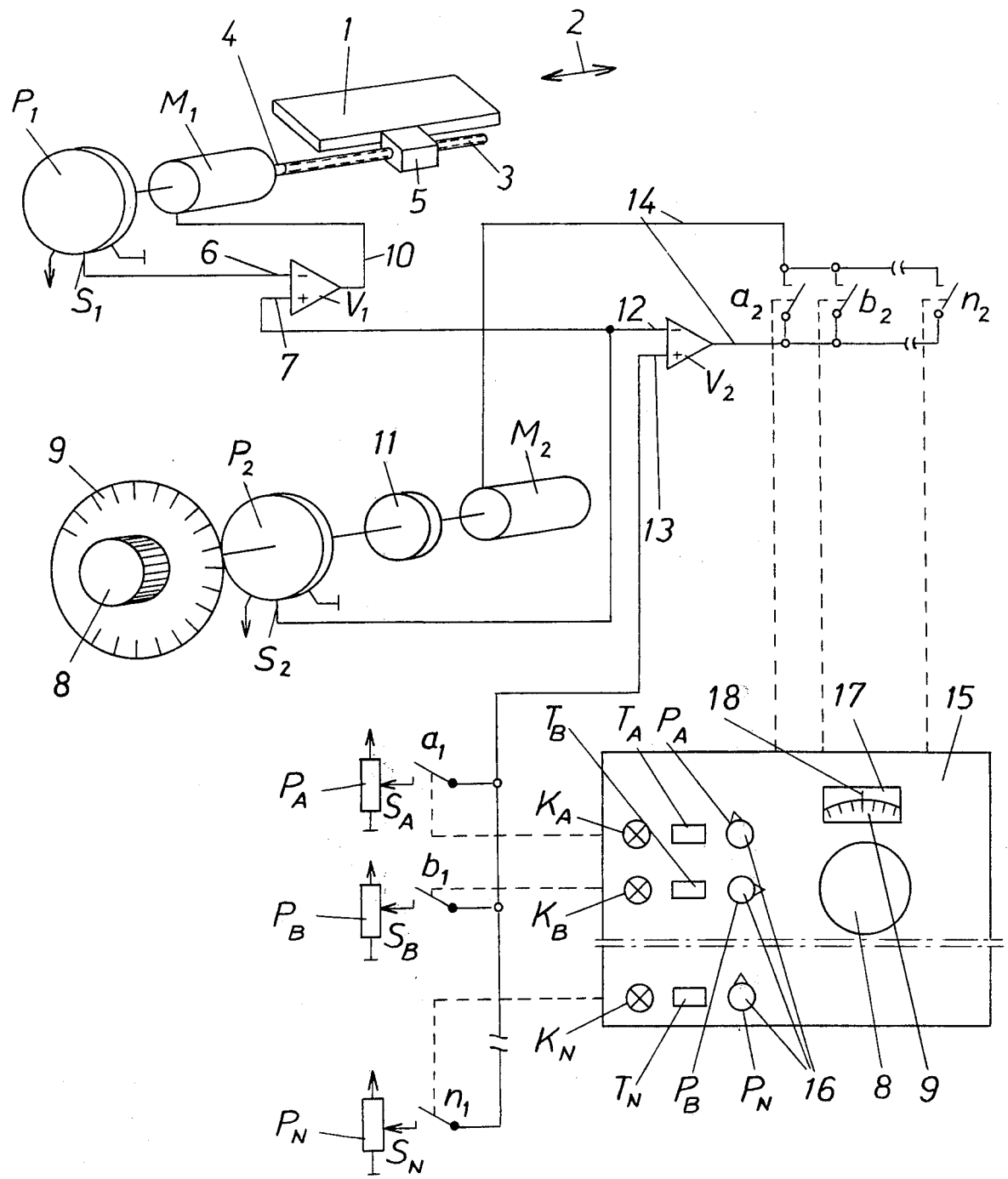

FILTER REGULATOR FOR MICROSPECTROPHOTOMETER

BACKGROUND OF THE INVENTION

The invention relates to an adjustable filter regulator for a microspectrophotometer, providing an adjustment knob coupled with a scale. The adjustment of the regulator enables the interference filter to be set for the particular wavelength to be filtered.

Microspectrophotometric reflection measurements are preferred in mineralogy, petrography, metallography, etc., when dealing with defined wavelengths. Transmission measurements often even take place in routine fashion involving two wavelengths which are always constant (for instance, in conjunction with the two wavelength method according to Arnstein and Patau).

Graduated interference filters are, to be sure, relatively inexpensive. However, they have the disadvantage that their graduation is not linear, that is, equal displacement length of travel do not correspond to a proportional wavelength change. Hence, solution of the present problem must start from the principle that the wavelength scale, in the use of graduated interference filters, is not linear. In addition, specimen dispersions dependent on the vaporization of the filters occur, which means that for every photometer or interference filter, a separately prepared individual scale is required. In reference thereto, what has always been done heretofore is, that the interference filters were carefully set by hand to the given value wanted. This hand-setting naturally leaves much to be desired as regards accuracy. Moreover, it requires an appreciably long time to make this hand-setting. However, it is especially disadvantageous in these hard-set devices that it is not possible to rapidly set and reliably reproducible preselected values when required, that is, during the measurement.

SUMMARY OF THE INVENTION

Now, the present invention is based on the task of creating a setting device for a graduated interference filter of a microspectrophotometer which, independent of the quality of the given interference filter, permits a rapid and accurate setting, as long as the scale is adapted to the filter. Moreover, in conjunction with the device according to the invention, the possibility should be afforded to develop it in such a way that the preselection of at least one wavelength is possible, which can then be set with the greatest of ease when required. These and other objects will be evident from the detailed description which follows.

DESCRIPTION OF THE DRAWING

The FIGURE is a schematic drawing illustrating the present invention.

DESCRIPTION OF THE PREFERRED EMBODIMENT

For the solution of this task, it is proposed, in conjunction with a setting device of the type initially mentioned, that the interference filter be moveable by means of a driving motor, which is controlled by a follower control circuit (known in the art) which includes a differential amplifier, on one input of which the actual signal of an actual signal transmitter moved with the interference filter is located. On the other input of the differential amplifier, the nominal signal of a nominal signal transmitter moved with the adjustment knob or the scale is connected.

A setting device of this construction can be manufactured with an appreciably small expense, and does afford, however, a relatively high accuracy. The device possesses above all the advantage that any setting of the wavelength of the filter, by corresponding rotation of the adjustment knob with the scale can take place rapidly, and when using a correspondingly large scale, very accurately also. While a relatively large speed-reduction must be present in order to achieve a satisfactory accuracy with mechanically-moved interference filters between the adjustment knob and the filter-movement as well as the scale, the use of such a speed-reduction with the device according to the invention is not necessary. Rather, by means of the adjustment knob, the scale can be rapidly adjusted to the corresponding wavelength value. The actual displacement of the interference filter, which can take place slowly, is of course then undertaken over the driving motor and the differential amplifier. To the extent that the interference filter should or must be replaced, a new filter is merely inserted and an etched or subdivided scale-disk corresponding to it. In other respects, nothing has to be changed in the entire set-up.

The electrical operation of the interference filter over a driving motor further affords the possibility of providing for a preselection device for differential wavelengths in a simple manner. For this purpose and in accordance with the invention, this is preferably done in such a way that the adjustment knob or the scale is displaceable by means of a servo-actuator motor which can be controlled likewise over a second follower control circuit exhibiting a second differential amplifier, in connection with which the actual signal for the second differential amplifier orignates from a second actual signal transmitter, moved with the adjustment knob or the scale, while at least one further, adjustable nominal signal transmitter serves for the production of the nominal signal.

Such a device hence affords the possibility of displacing the adjustment knob or the scale — and naturally also, the filter at the same time — over at least one further adjustable nominal signal transmitter, adjustable preferably by hand, and over a second follower control circuit. Inasmuch as provision is now made for a possiblity for switching on or off the follower control circuit for the servomotor or for a coupling or disconnection of the motor to or from the adjustment knob or the scale, the possibility is now afforded of either moving the interference filter directly by activation of the adjustment knob, or else of activating the adjustment knob by utilizing the further nominal signal transmitter as a function of its adjustment setting.

This construction likewise has the advantage that the adjustable nominal signal transmitter or such further transmitters need not be equipped with a special scale or the like, since through the servomotor, the scale coordinated to the adjustment knob is moved in a coordinated manner. Therefore, one can read off the wavelength selected when setting the further nominal signal transmitter, on the actual scale itself of the instrument.

It works out favorably if the connection between the second follower control circuit and the servomotor is selectively connectable and disconnectable, by means of at least one circuit element. In this way, the setting device can be converted more simply to hand-operation of the adjustment knob than if, for instance, an engageable and disengageable coupling were provided between servomotor and adjustment knob.

It is especially favorable if, at the nominal value input of the second differential amplifier, several further nominal signal transmitters are attached in parallel fashion selectively connectable over connecting devices, in conjunction with which the connecting devices for the further nominal signal transmitters are appropriately coupled with the circuit element (or circuit elements) between a second follower control circuit, in such a way that when connecting a further nominal signal transmitter to the second differential amplifier, the latter is attached to the servomotor. With such a development of the device, the advantage is achieved that by means of the further nominal signal transmitters, a quantity of wavelengths corresponding to their number can be preset. When activating one of the connecting devices, the connection between the second follower control circuit and the servomotor is simultaneously established, and as a function of the set value of the further nominal signal transmitter, the adjustment knob and the scale, and thus also the interference filter, are brought to the preselected position. Then, as soon as the corresponding connecting device is no longer activated, the equipment remains in the position occupied at a given time. In so doing, the operation can be simplified, for instance, by a control arrangement, known in itself, which is constructed in such a manner that the connecting devices, and along with them likewise the circuit elements, can be brought, by brief pressure, into the connecting circuit, in which it will remain at least until the scale with the adjustment knob would be rotated or adjusted by means of the servomotor to the desired value. This control circuit can be further provided with a locking mechanism, which prevents a simultaneous operation of several connecting devices, by which several further nominal signal transmitters would of course be simultaneously connected to the second differential amplifier.

An especially simple and logical assembly of the circuit arrangement for the device is achieved, if the number of the circuit elements is equal to the quantity of the connecting devices, and in each a connecting device and a circuit element are simultaneously controllable, for instance by means of the previous mentioned control electronics.

In order to be able to recognize, forthwith, which wavelength has just been selected, it is further proposed that a monitoring light, or the like, be coordinated to each of the further nominal signal transmitters, which light then displays the last nominal signal transmitter activated in any given case.

In order to make possible, without special circuiting means or expensive mechanical precautions, a setting of the interference filter by hand, and merely by operation of the adjustment knob independent of the further nominal signal transmitters, the servomotor is appropriately connected over a releasable coupling, preferably a slip (release) clutch, with the adjustment knob or the scale.

A noteworthy simplification of the construction of the setting device, according to the invention, can likewise be achieved in such a way that the nominal signal transmitter for the first differential amplifier controlling the driving motor simultaneously serves as an actual signal transmitter for the second differential amplifier controlling the servomotor.

Needless to say, the actual signal transmitters or the nominal signal transmitters can be constructional elements functioning on the basis of the most varied electrical or electromechanical means. Preferred, however, are those potentiometers, on the tape of which the actual or nominal signal is received for the differential amplifier or amplifiers.

Further characteristics, details and advantages of the invention are shown from the following description of a preferred exemplification, for a setting device according to the invention, reference being made to the single figure of the drawing, in which the essential constructional elements of the setting device are schematically demonstrated. In the following description, special reference is not made to advantages of the object of the invention, which result for the professional man based on the status of the technology.

In the drawing, schematically diagrammed, a graduated interference filter 1 is demonstrated, which can be set through shifting in the direction of the arrow 2 to different wavelengths. In order to be able to move the interference filter 1 in the arrow-direction 2, it is provided with a worm-wheel 5 in the exemplification demonstrated, in which, for instance, a gear-rack 3 engages, rotated by the shaft 4 of a driving motor $M_1$. Corresponding to the rotation (forwards or backwards) of the motor $M_1$, the interference filter 1 is then moved to and fro in the arrow-direction 2.

The slider $S_1$ of a first potentiometer $P_1$ is connected to the shaft 4 of the motor $M_1$ which serves as an actual signal transmitter. Consequently, the voltage applied to the actual value input 6 of a first differential amplifier $V_1$, dependent on the position of the motor $M_1$ and along with it of the slider $S_1$, will be changed.

On the nominal value input 7 of the second differential amplifier $V_1$, the voltage signal located on the tap $S_2$ of a second potentiometer $P_2$ is applied. The tap $S_2$ of the second potentiometer $P_2$ is connected with an adjustment knob 8, which moreover, is coupled with a scale 9, fixedly coupled or connected, for instance.

As a function of the position of the adjustment knob 8, the voltage tapped from the slider $S_2$ on the potentiometer $P_2$ is therefore changed. This voltage serves as nominal signal for the differential amplifier $V_1$. As a function of the difference between the nominal signal which is dependent on the position of the knob 8, and the actual signal which is dependent on the position of the interference filter 1, an output signal is produced at the differential amplifier $V_1$, which is conducted over the lead 10 to the driving motor $M_1$, and the rotation of which it causes, as a function of the magnitude of the signal and its polarity (plus or minus value). In so doing, as can be readily understood, the motor $M_1$ rotates, in the manner customarily known from standard follower control circuits, for so long a time until the actual signal at the input 6 of the amplifier $V_1$ is equal to the nominal signal at the input 7 of the same amplifier. In this way, the interference filter 1 can therefore be shifted in a simple manner, as a function of the position of the knob 8 and of the scale 9 in arrow-direction 2, in connection with which the adjustment knob 8 can be rapidly adjusted to the desired value, for instance the wavelength, by means of the scale 9. Immediately thereafter, the interference filter 1 automatically adjusts itself.

The adjustment knob 8 and consequently also the scale 9, is further attached, as schematically indicated in the drawing, over a slip clutch 11 with a second motor, the servomotor $M_2$. For its control, a follower control circuit likewise is used, corresponding to the motor $M_1$, which exhibits a second differential amplifier $V_2$. The drawing makes it possible to clearly recognize that the actual value input 12 of this differential amplifier $V_2$ is connected with the nominal value input 7 of the differential amplifier $V_1$. The effect of this is, that the potentiometer $P_2$ moveably connected with the adjustment knob 8 simultaneously serve as nominal signal transmitter for the amplifier $V_1$ and as actual signal transmitter for the amplifier $V_1$ and as actual signal transmitter for the amplifier $V_2$, whereby and understandably, a relatively simple circuit results.

At the nominal signal input 13 of the second differential amplifier $V_2$, several potentiometers $P_A$, $P_B$ . . . $P_N$ are connected parallel to each other, serving as further nominal signal transmitters. The sliders $S_A$, $S_B$ . . . $S_N$ of these further nominal signal transmitters $P_A$, $P_B$ . . . $P_N$ can be adjusted for the preselection of a given wavelength of the interference filter 1 to different nominal voltage values. At this juncture, it seems appropriate to point out the fact that the different potentiometers $P_1$, $P_2$, $P_A$, $P_B$ . . . $P_N$ with their stationary terminals in each case are grounded and lie on a fixed voltage.

For selective connection of the further potentiometers $P_A$, $P_B$ . . . $P_N$ to the nominal value input 13 of the second differential amplifier $V_2$, contact terminals $a_1$, $b_1$ . . . $n_1$ are used in each instance. These contact terminals $a_1$, $b_1$ . . . $n_1$ can be alternately closed, in the example demonstrated, over push-buttons $T_A$, $T_B$ . . . $T_N$.

When operating the corresponding push-buttons $T_A$, $T_B$ . . . $T_N$, a second $a_2$, $b_2$ . . . $n_2$ consisting of a series of parallel-connected contact terminals $a_2$, $b_2$ . . . $n_2$ are connected into the output lead 14 of the second differential amplifier $V_2$, which leads to the servomotor for the adjustment knob 8 and the scale 9.

The circuit set-up has, as a consequence, that only whenever one of the first switches $a_1$, $b_1$ . . . $n_1$ is closed and at the same time, one of the further potentiometers $P_A$, $P_B$ . . . $P_N$ is attached to the nominal value input 13 of the second differential amplifier $V_2$, the output signal reaches this differential amplifier $V_2$ on the motor $M_2$, whereas otherwise, for instance if the adjustment knob 8 should be manually operated, the servomotor $M_2$ remains unfed. In this case, due to the presence of the slipper clutch 11 between the adjustment knob 8 and the servomotor $M_2$, the adjustment knob 8 can be readily displaced manually for the change of the position of the interference filter 1 in arrow-direction 2.

To the lower right in the drawing, finally, a front plate 15 is further schematically demonstrated, as can be provided if there is a setting device according to the invention. On this front plate, as the drawing makes it possible to recognize, we find on the one hand, and over each other, the different $T_a$, $T_B$ . . . $T_N$ push-buttons arranged, serving for the operation of the contact terminals $a_1$, $b_1$ . . . $n_1$ and $a_2$, $b_2$ . . . $n_2$. Alongside these, the pilot lamps are provided, in a series over each other, coordinated with the push-buttons. On the other side of the push-buttons $T_A$, $T_B$ . . . $T_N$, finally the operating knobs 16 are located, for the sliders $S_A$, $S_B$ . . . $S_N$ of the potentiometers $P_A$, $P_B$ . . . $P_N$. Finally, in addition, a cutout of the scale 9, which can be made to be very large, is visible.

The method of operation of the device according to the invention is now as follows, in conjunction with which we start from the principle that the graduation of the scale 9, with reference to the wavelength, corresponds to the given linearity of the interference filter 1.

To the extend that it is desired to set a given wavelength of the interference filter 1, which need not be repeated, the adjustment knob and along with it the scale 9, is merely set to a wavelength value which is determinable by means of a marking 18 in the window 17. By means of the follower control circuit already discussed above, operating from the first differential amplifier $V_1$ and both of the potentiometers $P_1$ and $P_2$ with the sliders $S_1$ and $S_2$, the interference filter is then set to the desired value, over the motor $M_1$.

However, if we wish to stationarily set one or several wavelength values of the interference filter, that is, to afford the possibility for rapid renewed setting of the interference filter to this value, then one of the push-buttons $T_A$, $T_B$ . . . $T_N$ is activated. By so doing, one of the potentiometers $P_A$, $P_B$ . . . $P_N$, serving as a further nominal signal transmitter, is attached to the nominal value input 13 of the second differential amplifier $V_2$. Simultaneously, the output lead 14 of the amplifier $V_2$ to the servomotor $M_2$ is completed, over the corresponding contact stud (terminal) $a_2$, $b_2$ . . . $n_2$.

If we now rotate the operational knob 16 of the corresponding potentiometer $P_A$, $P_B$ . . . $P_N$, then the motor $M_2$, as a function of the voltage difference at the inputs 12 and 13 of the amplifier $V_2$, will likewise rotate. In so doing, the adjustment knob 8 and the scale 9 are driven along at the same time, over the slip clutch 11. The consequence of this is, that any given wavelength value set can be read off in the window 17.

When rotating the adjustment knob 8, the slider $S_2$ of the potentiometer $P_2$ is also naturally moved, so that if the occasion arises, the nominal signal at the input of the amplifier $V_1$ changes. As a function of the difference between the actual signal at the input 6, and the nominal signal at the input 7 of the amplifier, the motor $M_1$ likewise starts running, and sets the interference filter, corresponding to whatever wavelength is displayed on the scale 9.

In the same manner, other wavelengths, depending in each case on the number of the further potentiometers $P_A$, $P_B$ . . . $P_N$ present, can be preset or preselected, for which purpose the scale 9 in the window 17 must naturally be viewed.

Then, if the further nominal signal transmitters or potentiometers $P_A$, $P_B$ . . . $P_N$ are once set, the interference filter 1 can be brought to the wavelength selected, in a simple manner, merely by pressure on the corresponding push-button $T_A$, $T_B$ . . . $T_N$, reproducibly.

In the drawing, a hand-operated exemplification is demonstrated. In conjunction therewith, the circuit will of course be appropriately such, that a holding (locking) device is provided, so that even with only brief pressure on one of the push-buttons $T_A$, $T_B$ . . . $T_N$, the corresponding contact studs (terminals) $a_1$, $b_1$ . . . $n_1$ and $a_2$, $b_2$ . . . $n_2$ will stay closed for a sufficient time until the adjustment knob 8 with the scale 9 has assumed the corresponding position. It is further appropriate to build-in a known bolting (clamping) device, which prevents the contacts $a_1$, $b_1$ . . . $n_1$ from being closed, if several of the push-buttons $T_A$, $T_B$ . . . $T_N$ are simultaneously activated.

The pilot lights $K_A$, $K_B$ . . . $K_N$ which can further be seen from the drawing can likewise be so attached in a manner known in itself, for instance over additional contact studs (terminals), that is possible to forthwith determine which of the push-buttons $T_A$, $T_B$ . . . $T_N$ was just activated.

In conclusion, reference may further be made to the fact that the device according to the invention can find application otherwise than only in hand-operation.

Rather, a special advantage of the device according to the advantage is, that instead of the mechanically-operated contact studs (terminals) $a_1, b_1 \ldots n_1$ and $a_2, b_2 \ldots n_2$, obviously relays or electronic switches could also be utilized, in which case it would forthwith be possible to undertake the commutation to the different wavelengths, not by hand but automatically; for instance, over a computer, which could then be programmed in a very special manner.

I claim:

1. In a device for setting a graduated interference filter of a microspectrophotometer having an electrically operable adjustment means controlled by a graduated control knob (8) for setting the filter to a chosen wavelength, the improvement comprising a first drive motor ($M_1$) operably connected to the filter, a first follower control circuit including a first differential amplifier ($V_1$) having an output connected to the drive motor, an input (6) of the first differential amplifier being connected to a signal generator ($P_1$) responsive to movement of the interference filter and another input (7) connected to a nominal signal generator ($P_2$) responsive to movement of the control knob, a second drive motor ($M_2$) selectively connectable to said control knob (8), a second follower control circuit including a second differential amplifier ($V_2$), one input of the second amplifier ($V_2$) being connected to said nominal signal generator ($P_2$), another input of the second amplifier ($V_2$) being selectively connectable to one of a plurality of adjustable signal generators ($P_A, P_B \ldots P_N$), an output of said second amplifier being operably connected to said second drive motor ($M_2$) whereby one of a plurality of predetermined settings of said filter can be chosen by activating one of said adjustable signal generators and other settings of said filter can be chosen by manually moving control knob (8).

2. The improvement according to claim 1 wherein said second drive motor ($M_2$) is selectively connectable to said control knob (8) through an electrically controlled clutch (11).

* * * * *